US006513234B2

(12) United States Patent
Wilemon et al.

(10) Patent No.: US 6,513,234 B2
(45) Date of Patent: Feb. 4, 2003

(54) METHOD OF MAKING FIBER REINFORCED UTILITY CABLE

(76) Inventors: Jerry W. Wilemon, 194 Rd. 209, Burnsville, MS (US) 38833; Rudolph P. Suto, 125 W. Larkspur, Munhall, PA (US) 15120; Forrest F. Stacy, 1948 Harbour Oak Dr., Snellville, GA (US) 30078

( * ) Notice: Subject to any disclaimer, the term of this patent is extended or adjusted under 35 U.S.C. 154(b) by 23 days.

(21) Appl. No.: 09/881,311

(22) Filed: Jun. 13, 2001

(65) Prior Publication Data

US 2002/0189087 A1 Dec. 19, 2002

(51) Int. Cl.[7] .................................................. B23P 19/00
(52) U.S. Cl. ............................................ 29/745; 29/825
(58) Field of Search .......................... 29/825, 828, 829, 29/745, 779, 728

(56) References Cited

U.S. PATENT DOCUMENTS

| | | | | |
|---|---|---|---|---|
| 4,211,591 A | * | 7/1980 | Stiles | 156/180 |
| 4,305,770 A | | 12/1981 | Stiles | |
| 4,365,865 A | | 12/1982 | Stiles | |
| 4,368,214 A | | 1/1983 | Gillette | |
| 4,420,360 A | | 12/1983 | Batisse | |
| 4,886,562 A | | 12/1989 | Pinson | |
| 5,026,447 A | | 6/1991 | O'Connor | |
| 5,234,058 A | | 8/1993 | Sas-Jaworsky et al. | |
| 5,492,583 A | | 2/1996 | Fingerson et al. | |
| 5,607,531 A | | 3/1997 | Needham et al. | |
| 5,632,837 A | | 5/1997 | Carmien | |
| 5,830,304 A | | 11/1998 | Priesnitz et al. | |

* cited by examiner

*Primary Examiner*—Edward K. Look
*Assistant Examiner*—Dwayne J. White
(74) *Attorney, Agent, or Firm*—Clifford A. Poff

(57) ABSTRACT

A method and apparatus for producing a reinforce a conductor of a utility transmission line is provided by selecting an electrical or communication conductor fo a desired utility, selecting a plurality of strands of filaments to mechanically reinforce the utility transmission line, selecting a polymer treated with a catalyst to encase the strands of filament and the transmission line, pulling the strands of filament and the transmission line encased in the treated polymer through an elongated protrusion die to form an electrically insulated and reinforced utility cable, maintaining an elevated temperature gradient along the die to control the physical property of the polymer as the polymer catalyze, bending the cable in reversed directions after emerging from the protrusion die during completion of the catalyzing and during cooling to ambient temperature to avoid the occurrence of a permanent set in the catalyzed polymer, and coiling the newly formed electrically insulated and reinforced utility cable.

15 Claims, 5 Drawing Sheets

METHOD OF MAKING FIBER REINFORCED UTILITY CABLE

BACKGROUND OF THE INVENTION

1. Field of the Invention

This invention relates to a method to manufacture a composite reinforced utility conductor for use in aerial, underground, underwater transmission, distribution and service for electrical and communication utilities, and more particularly to a method and apparatus for producing such a reinforced utility conductor by molding and hardening a polymer embedded with continuous filaments in a thermally controlled protrusion die.

2. The Prior Art

The metal used for electrical conductors is selected for the desired electrical properties but the metal is structurally weak in terms of the strength needed for suspending the conductor as an electric transmission line and also withstand the forces imposed by wind and ice. To overcome this problem, the electric transmission line is made by wrapping several electrical conductors around a strong steel core. The steel reinforced conductors attached to poles or towers are exposed to the elements using the atmosphere for insulation between transmission lines.

Pultrusion is a well known method for processing material to form a finished product having a desired cross sectional dimension and physical properties imparted by pulling the product along a converging surface of an elongated die. The pultrusion method is used according to the present invention for a cost effective process for applying insulation material and if desired a semi-conducting coating to an aluminum or copper electrical conductor or a light guide cable. Embedded in the insulation material during passage through the protrusion die are stands of filament used to impart the needed strength.

It is an object of the present invention to provide a fiber reinforced utility cable manufactured in a process in which catalyzing polymer is molded and hardened in an elongated die while the temperature is incrementally varied along the length of the die.

It is a further object of the present invention to provide a fiber reinforced utility cable manufactured in a process and by apparatus including passing a molded and hardened fiber reinforced utility cable through a lopper to work the cable at ambient temperature by repeated reverse bending prior to coiling.

It is another object of the present invention to provide a method and apparatus for reinforcing a utility cable with multiple strands of fiber in a catalyzed polymer encased within a catalyzed polymer containing carbon fiber to form an electromagnetic shield, which is in turn encased with a catalyzed polymer.

SUMMARY OF THE INVENTION

In accordance with the present invention there is provided a method apparatus for manufacturing a composite reinforced utility cable by selecting an utility conductor with an applied grease like film that may contain micronized carbon and then compressing reinforcing filaments which have been coated with epoxy, polyurethane, or similar polymers followed by passing the newly formed bundle through a heated die. The selected polymer is preferably dicyclopentadiene and a catalyst may be introduced into the die along with the bundle consisting of the utility conductor and reinforcing filaments and controlling the die temperature to control the exothermic catalytic reaction. Thus producing a composite reinforced, insulated conductor of sufficient mechanical strength to withstand aerial installation, and with sufficient dielectric strength to allow for close spacing of the electrical conductors to overcome induction problems when transmission lines constructed parallel metallic structures such a natural gas lines in a utility corridor, and overcoming problems of short circuit arcing to trees in narrow rights-of-way.

Additionally, a high voltage underground or coaxial cable can be made by passing the composite reinforced conductor previously described through a second process compressing carbon fibers and conductors which been previously dipped in epoxy or polyurethane, or similar material, around the composite reinforced conductor or introducing dicyclopentadiene and a catalysis to the composite reinforced conductor when the newly formed bundle is again forced through a thermally controlled die. The carbon fiber containing conductors functions as a electromagnetic shield as in axial cables and provides a test point for monitoring current leakage to forecast failure in high voltage cable in subterranean placement sites. A third pass through a thermally controlled die is used to apply an outer layer of only a catalyzed polymer to cable used in coaxial and high voltage underground applications.

More particularly according to the present invention there is provided an apparatus for forming a sheathed utility cable including the combination of an applicator for applying a mass of a catalyzed polymer to a utility conductor and plurality of strands of reinforcing filaments, a protrusion die having an elongated continuous flow space for passage of bundle consisting of a caterized polymer, utility conductor and reinforcement filaments discharged from an applicator, a sleeve surrounding said protrusion die for forming an annular chamber there between, a plurality of closure members at spaced apart locations along an annular chamber for forming discrete chambers for passage of a fluid medium, inlet and outlet conduits connecting to each of the discrete chambers for passage of a fluid medium, a controller for a fluid medium passing to each of the discrete chambers for maintaining a predetermined thermal gradient along the protrusion die, and a driven puller for continuously advancing a bundle from the die.

The present invention also provides a method to reinforce a conductor of a utility transmission line, the method including the steps of selecting a transmission line for a desired utility, selecting a plurality of strands of filaments to mechanically reinforce the utility transmission line, selecting a polymer treated with a catalyst to encase the strands of filament and the transmission line, pulling the strands of filament and the transmission line encased in the treated polymer through an elongated protrusion die to form an electrically insulated and reinforced utility cable, maintaining an elevated temperature gradient along the die to control the physical property of the polymer as the polymer catalyze, bending the polymer in reversed directions after emerging from the protrusion die during completion of the catalyzing and during cooling to ambient temperature to avoid the occurrence of a permanent set in the catalyzed polymer, and coiling the newly formed electrically insulated and reinforced utility cable.

BRIEF DESCRIPTION OF THE DRAWING

These features and advantages of the present invention as well as others will be more fully understood when the following description is read in light of the accompanying drawings in which.

DETAILED DESCRIPTION OF THE INVENTION

Figure 1:
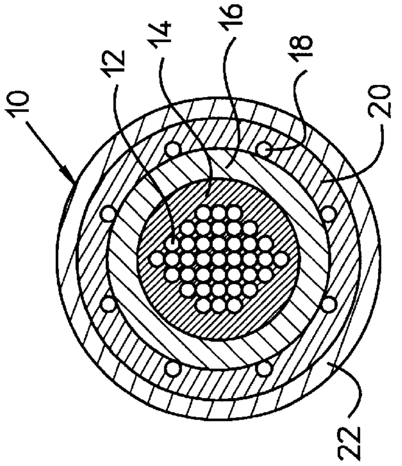
FIG. 1 is a cross-sectional view of an electrical utility cable suitable for coaxial and underground transmission of current at a high voltage level.

In FIG. 1 there is illustrated a reinforced utility cable 10 for high voltage electric current and includes a multiplicity of individual electrical conductors 12 collected into a bundle formation as illustrated and surrounded by a blended layer 14 of carbon and grease. The layer 14 is used to prevent adhesion between the conductors 12 when enveloped in a catalyzed polymer. A reinforcement layer 16 consists of a plurality of continuous strands of filament and a catalyzed polymer. Carbon fibers (not shown) and conductors 18 are contained in an overlying layer of catalyzed polymer 20. An outer sheathing 22 consists of a catalyzed polymer is applied for imparting high quality electrical insulation. It is to be understood that it is within the scope of the present invention to provide an electrical utility cable without the outer sheathing 22 and the layer of catalyzed polymer 20 including the carbon fibers and conductors therein.

Figure 2:
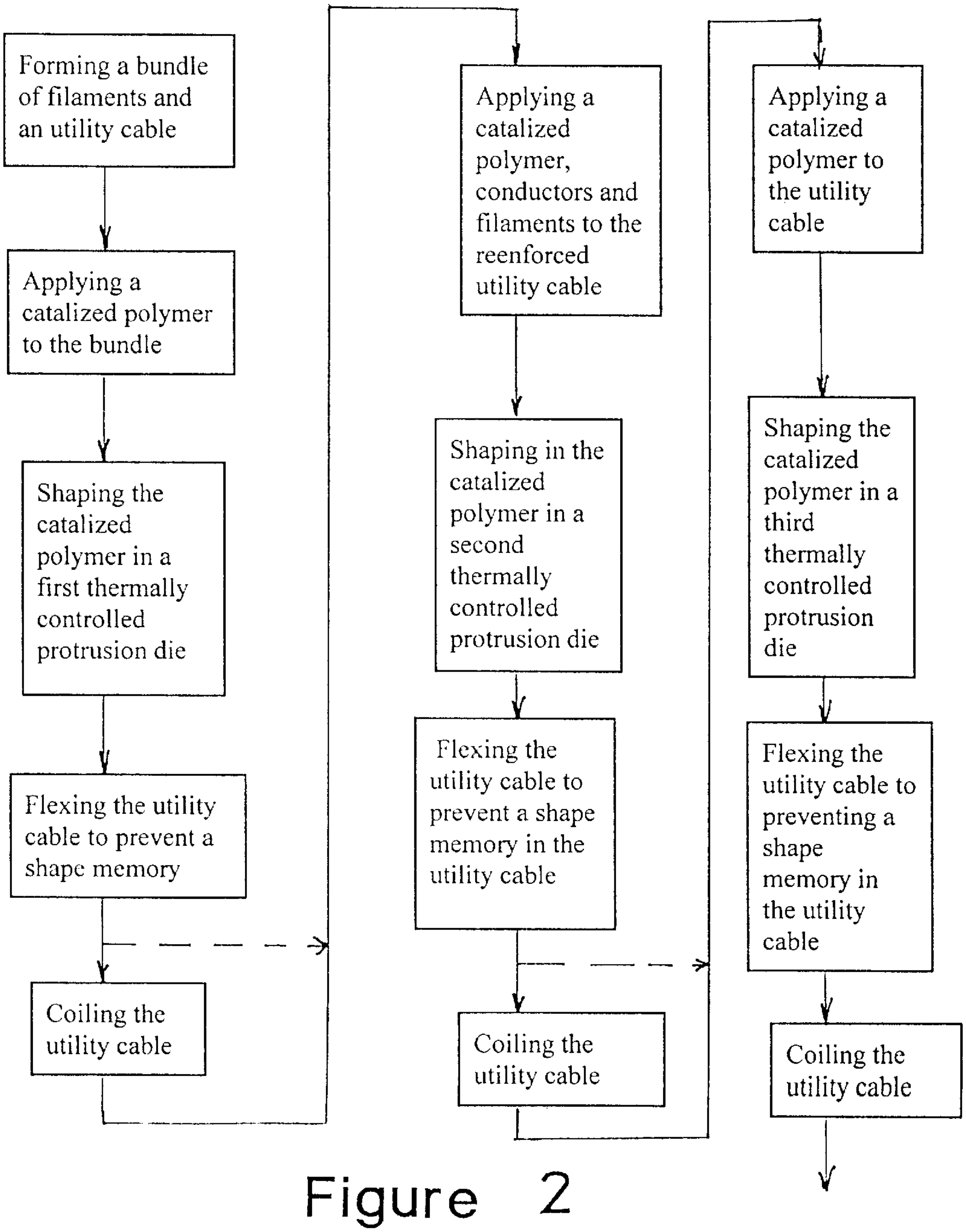
FIG. 2 is a flow diagram illustrating the process for forming the utility cable shown in FIG. 1.

The method for forming the cable shown in FIG. 1 is illustrated in the flow diagram of FIG. 2 and includes forming a bundle of filaments disbursed about the outer periphery of electrical conductors coated with grease containing micronized carbon. A catalyzed polymer is then added to the bundle and then the bundle and polymer are drawn through a thermally controlled protrusion die to control the catalyzing process and establish the cross sectional shape of the utility cable. The cable is then flexed in reversing directions while the catalyzing process is completed to avoid the formation of set shape due to the coiled configuration on a storage reel. With or without the coiling of the cable, the processing of the cable is continued by again applying a catalyzed polymer containing carbon fibers to the outer surface of the cable while conductors are distributed about the cable surface. A second thermally controlled protrusion die is used to control the catalyzing process and establish the new cross sectional shape for the utility cable. The cable is again flexed in reversing directions while the catalyzing process is completed to avoid the formation of set shape when coiled. And again with or without the coiling of the cable, the processing is continued by applying only catalyzed polymer to the outer surface of the cable and using a third thermally controlled protrusion die to control the catalyzing process and establish the final cross sectional shape for the utility cable. The cable is again flexed in reversing directions while the catalyzing process is completed to avoid the formation of set shape and then the utility cable is coiled for shipment.

Figure 3:
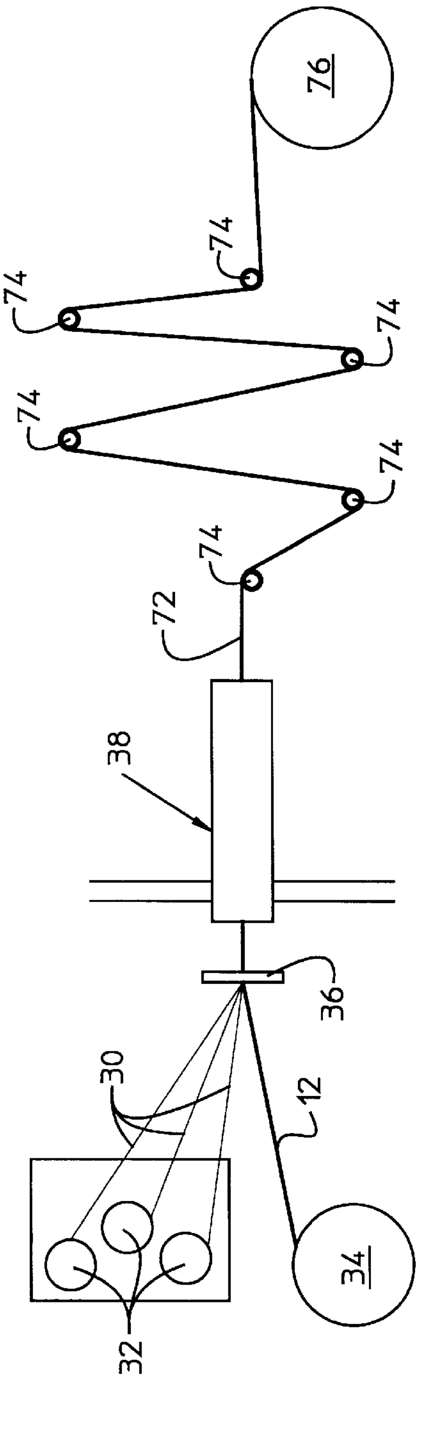
FIG. 3 is a schematic illustration of a processing line to form a utility cable according to one embodiment of the present invention.

Referring to FIG. 3, there is illustrated the preferred embodiment of apparatus for forming a continuous pultruded utility cable according to the present invention. Multiple strands of continuous fibers 30, such as Kevlar, for example, are drawn from storage creels 32, and are distributed about the bundle of electrical conductors 12 which are coated with the mixture of carbon and grease and pulled from a storage reel 34. The fibers 30 have been previously mechanically or chemically abraded in order to enhance adherence of the fiber with a polymer. The fibers 30 are disbursed about the bundle of conductors 12 by passage through apertures in a comb 36 arranged to organized the fibers about the periphery. The conductors 12 and the abraded fibers 30 emerging from the comb pass into a protrusion die 38 where the entrance portion contains orifices for the introduction of a polymer and a catalyst. According to the embodiment of FIG. 3 there is a resin preferably cyclopentadiene and a catalyst such as ruthenium dichloride. The reaction becomes exothermic due to ring open metathesis polymerization. The reaction is relative slow and therefore a relatively long protrusion die is provided to allow the polymer to gel before emerging from the die.

Figure 4:
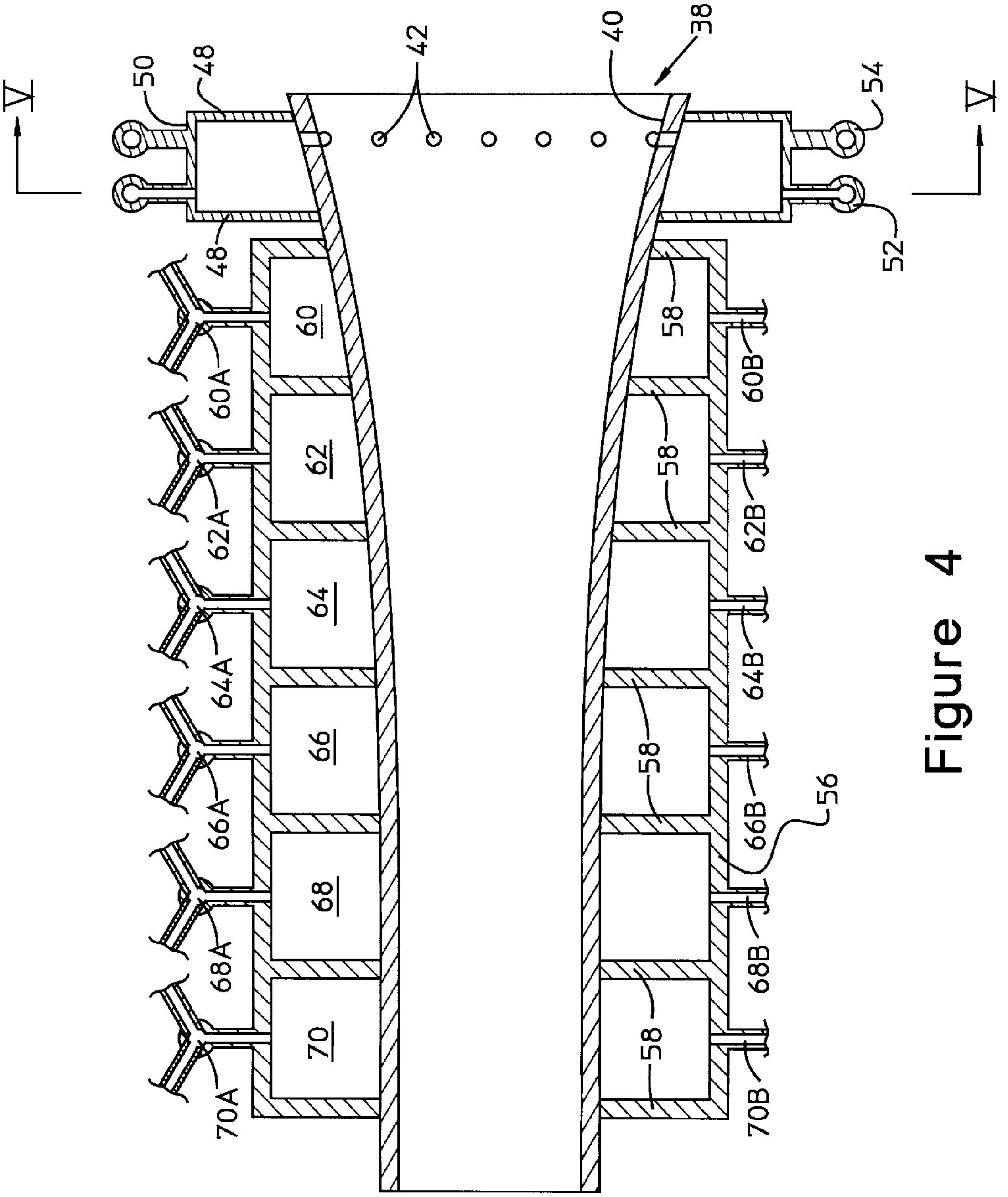
FIG. 4 is an enlarged longitudinal sectional view illustrating a protrusion die incorporated in the processing line shown in FIG. 3.

The details of the construction of the protrusion die are illustrated in FIG. 4 and include a tubular die 40 having an internal passageway resembling the shape of a venturi. At the entrance portion of the die there are arranged flow control orifices 42 lying within a plane and communicating with side-by-side chambers 44 and 46. These chambers are formed by partition walls 44 extending between side and end walls 48 and 50, respectively. The chambers 44 and 46 communicate with manifolds 52 and 54 respectively by supply pipes. Manifold 52 supplies cyclopentadiene and manifold 54 supplies ruthenium dichloride. The chemical reaction being exothermic commence at a temperature in the range of 80° to 120° F. quickly reaching a temperature of about 360° F. depending on the ratio of the catalyst to the polymer. The temperature is controlled incrementally along the length of the die by arranging a manifold tube 56 exteriorly along the die with internal partitioning walls 58 subdividing the cavity into manifold chambers 60–70. The manifold chambers 60–70 are connected by supply pipes extending to thermostatic mixing valves 60A–70A, respectively, having entrance ports coupled to supplies of chilled water and hot water. The manifold chambers 60–70 are each connected to drain lines 60B–70B, respectively. The thermostatic mixing valves induce a temperature gradient commencing at a maximum temperature of about 360° F. at the die wall joined with manifold chamber 60 by the introduction of relatively hot water as compared with the water introduced to successive manifold chambers.

Figure 5:
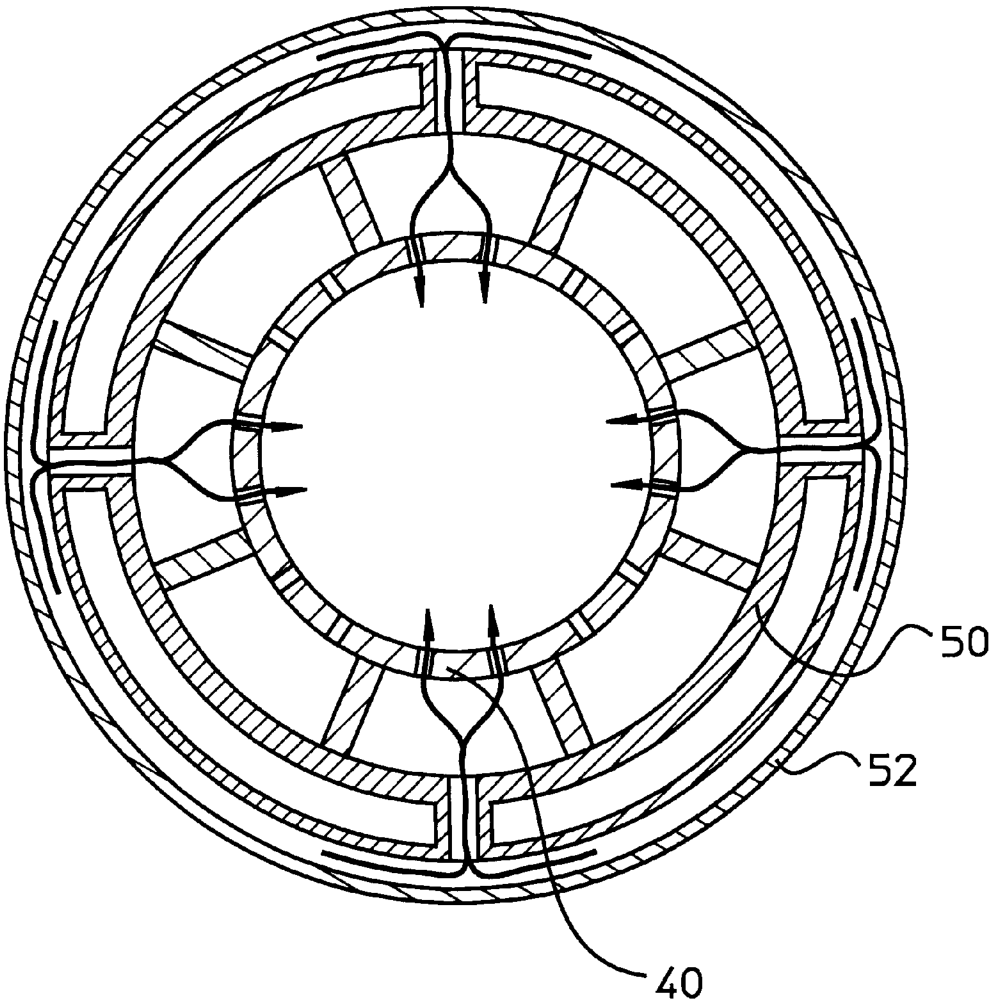
FIG. 5 is a sectional view taken along lines V—V of FIG. 4.

The molded utility cable 72 emerging from the die 38 is passed between spaced apart lopper rolls 74 in a zigzag fashion to repeatedly flex the cable and avoid the formation of a memory or set that might occur when the cable is stored in coiled form. The looper rolls 74 are driven and additionally served functions of pullers to advance the cable from the protrusion die. The cable is then either coiled on a reel 76 without further processing or past on for further processing with or without coiling. Continued processing is accomplished in second and third protrusion dies embodying the same construction as shown in FIGS. 4 and 5 but with the die surface having the same venturing shape enlarged to process the additional layers of polymer. The continued processing is by the application of a catalyzed polymer, conductors and filaments as explained hereinbefore and illustrated in FIG. 2.

Figure 6:
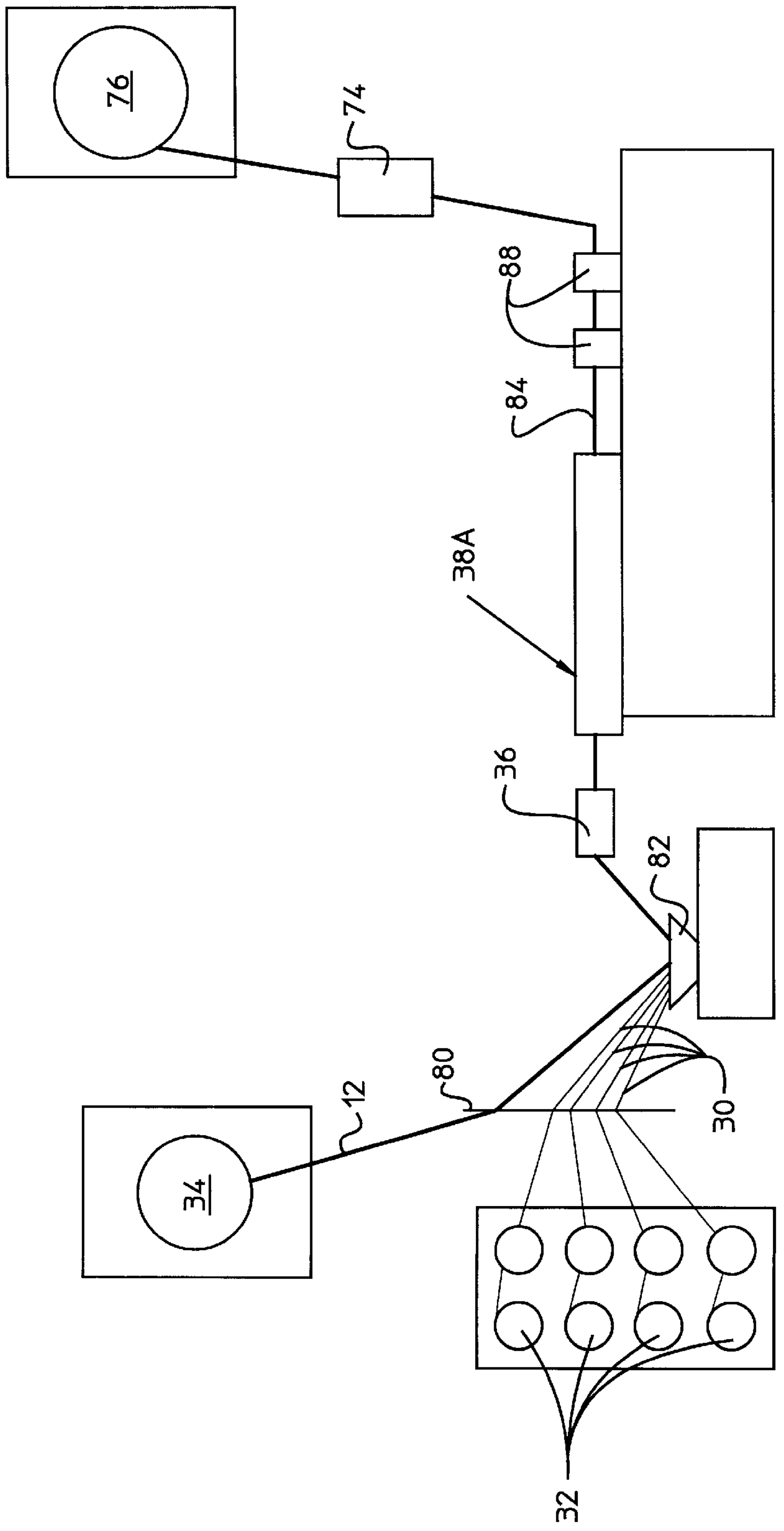
FIG. 6 is a schematic illustration of a processing line to form a utility cable according to a second embodiment of the present invention.

A second embodiment of the present invention is illustrated in FIG. 6 and differs from the first embodiment by the provision of apparatus for the use of a thermosetting resin, which requires the addition of heat for initiating the catalytic reaction to harden the resin. Multiple strands of abraded continuous fibers 30, such as Keviar, for example, are drawn from the storage creels 32, and are distributed about the bundle of the electrical conductors 12 which are coated with the mixture of carbon and grease and pulled from the storage reel 34. The fibers 30 and the bundle of conductors are disbursed by a comb 80 for individual submersion in a vessel 82 containing a catalyzed polymer preferably a heat setting epoxy. The fibers 30 are then disbursed about the bundle of conductors 12 by passage through the apertures in a comb 36. The conductors 12 and the abraded fibers 30 emerging from the comb pass into a protrusion die 38A which is the same as protrusion die 38 with exception that the entrance portion does not contain orifices for the introduction of a polymer and a catalyst. The endothermic reaction in the die 38A is accomblished by the heat supplied by the hot water controlled by the thermostatic mixing valves 60A–70A to allow the polymer to gel before emerging from the die.

The molded utility cable 82 emerging from the die 38A extends through spaced apart pullers 86 and 88 used to pull the molded utility cable through the die 38A and then passed between spaced apart lopper rolls 74 in a zigzag fashion to repeatedly flex the cable and avoid the formation of a memory or set that might occur when the cable is stored in coiled form. As in the first embodiment, the cable is then either coiled on a reel 76 or continuously processed by the application of a catalyzed polymer, conductors and filaments as explained hereinbefore and illustrated in FIG. 2.

While the present invention has been described in connection with the preferred embodiments of the various figures, it is to be understood that other similar embodiments may be used or modifications and additions may be made to described embodiments for performing the same function of the present invention without deviating there from. Therefore, the present invention should not be limited to any single embodiment, but rather construed in breadth and scope in accordance with the recitation of the appended claims.

We claim:

1. Apparatus for forming a sheathed utility cable, said apparatus including the combination of:

an applicator for applying a mass of a catalyzed polymer to-a utility conductor and plurality of strands of reinforcing filaments, a protrusion die having an elongated continuous flow space for passage of bundle consisting of said caterized polymer, utility conductor and reinforcement filaments discharged from said applicator a sleeve surrounding said protrusion die for forming an annular chamber there between;

a plurality of closure members at spaced apart locations along said annular chamber for forming discrete chambers for passage of a fluid medium;

inlet and outlet conduits connecting to each of said discrete chamber for passage of a fluid medium;

a controller for a fluid medium passing to each of said desecrate chambers for maintaining a predetermined thermal gradient along said protrusion die; and a driven puller for continuously advancing said bundle from said die.

2. The apparatus according to claim 1 further including a plurality of creels for supplying said reinforcement filaments to said applicator.

3. The apparatus according to claim 1 further including a cure lopper for continuously reversely bending said bundle after discharge from said protrusion die.

4. The apparatus according to claim 1 further including a second applicator for applying a mass of uncured polymer and a plurality filer conductors to said bundle.

5. The apparatus according to claim 1 wherein said applicator includes nozzles supported in an entry end of said protrusion die and wherein said apparatus further includes headers for supplying a catalyst and a polymer to said utility conductor.

6. The apparatus according to claim 1 wherein said protrusion die includes a venturi shaped die surface.

7. The apparatus according to claim 1 wherein said applicator comprises a vessel for a bath of a catalyzed polymer.

8. A method to reinforce a conductor of a utility transmission line, said method including the steps of:

selecting a transmission line for a desired utility;

selecting a plurality of strands of filaments to mechanically reinforce the utility transmission line;

selecting a polymer treated with a catalyst to encase the strands of filament and the transmission line;

pulling the strands of filament and the transmission line encased in the treated polymer through an elongated protrusion die to form an electrically insulated and reinforced utility cable;

maintaining an elevated temperature gradient along the die to control the physical property of the polymer as the polymer catalyze;

bending the polymer in reversed directions after emerging from the protrusion die during completion of the catalyzing and during cooling to ambient temperature to avoid the occurrence of a permanent set in the catalyzed polymer; and coiling the newly formed electrically insulated and reinforced utility cable.

9. The method according to claim 8 wherein said step of maintaining a temperature gradient includes differentially controlling the temperature in the protrusion die at multiple sites along the die.

10. The method according to claim 8 wherein the selected polymer and catalyst are separately applied to the separate transmission line at an entry portion of the protrusion die.

11. The method according to claim 10 wherein the selected polymer is cyclopentadiene and wherein the selected catalyst is ruthenium bichloride.

12. The method according to claim 8 wherein the selected polymer and catalyst are mixed to form a bath.

13. The method according to claim 12 wherein the said bath comprises an epoxy.

14. A method to reinforce a conductor of a utility transmission line, said method including the steps of:

selecting a transmission line for a desired utility;

selecting a plurality of strands of filaments;

dispersing the strands of filament about the transmission line in a catalyzed polymer at the entrance to a die;

pulling the selected transmission line and the strands of filament containing a resin and catalyst through an elongated die having a length sufficient to allow an exothermic ring open metathesis polymerization of the resin;

differentially cooling the die at multiple sites along the die to control physical property of the polymerized resin; and subjecting the extruded product issuing from the die to repeated reverse mechanical bending during completion of the polymerization and final cooling.

15. The method according to claim 14 wherein the said catalyzed polymer is cyclopentadiene and wherein the selected catalyst is ruthenium bichloride.

* * * * *